United States Patent [19]

Tanaka et al.

[11] Patent Number: 4,773,222
[45] Date of Patent: Sep. 27, 1988

[54] PNEUMATIC BRAKE BOOSTER WITH BOOSTER-CYLINDER-END RETAINED RELAY VALVE

[75] Inventors: Masakatsu Tanaka; Hirohisa Totoki, both of Kanagawa, Japan

[73] Assignee: Nippon Air Brake Co., Ltd., Japan

[21] Appl. No.: 735,055

[22] Filed: May 17, 1985

[30] Foreign Application Priority Data

May 18, 1984 [JP] Japan .............................. 59-72874[U]

[51] Int. Cl.[4] .................... B60T 17/22; F15B 15/18; F16D 63/00; F16K 31/12
[52] U.S. Cl. ........................................ 60/534; 60/578; 60/593; 60/586; 92/5 R; 188/1.11; 137/627.5; 91/461
[58] Field of Search ................... 60/547.1, 548, 578, 60/588, 592, 593, 534; 92/5 R; 188/1.11; 137/627.5; 91/461

[56] References Cited

U.S. PATENT DOCUMENTS

| | | | |
|---|---|---|---|
| 2,832,316 | 4/1958 | Ingres | 60/547.1 X |
| 2,957,454 | 10/1960 | Stelzer | 60/551 X |
| 3,106,874 | 10/1963 | Schultz | 60/547.1 X |
| 3,259,146 | 7/1966 | Hager | 60/547 X |
| 3,712,340 | 1/1973 | Deem | 251/26 X |
| 4,316,529 | 2/1982 | Yanagawa et al. | 60/593 X |
| 4,445,334 | 5/1984 | Derrick | 60/578 X |

FOREIGN PATENT DOCUMENTS

| | | | |
|---|---|---|---|
| 57-41245 | 3/1982 | Japan | 60/578 |
| 57-194148 | 11/1982 | Japan | 60/578 |
| 58-63562 | 4/1983 | Japan | 60/578 |

*Primary Examiner*—Robert E. Garrett
*Assistant Examiner*—George Kapsalas
*Attorney, Agent, or Firm*—Jones, Day, Reavis & Pogue

[57] ABSTRACT

A pneumatic-hydraulic booster for vehicle includes a master cylinder part; a pneumatic cylinder part combined with the master cylinder part which includes a power piston slidable fitted to a cylindrical casing and an output rod fixed to the power piston, extending to the master cylinder part; a partition wall body fitted to the cylindrical casing; and a relay valve part arranged at the opposite side of the partition wall body from the power piston in the cylindrical casing. The relay valve supplies compressed air into an air pressure chamber formed between the partition wall body and the power piston and discharges the compressed air from the air pressure chamber to the atmosphere. When compressed air is supppplied into the air pressure chamber through the relay valve part the power piston and the output rod are moved forwards to generate hydraulic pressure in the master cylinder. The hydraulic pressure is applied to a wheel cylinder for braking. The cylindrical casing is open at the side of the partition wall body opposite to the power piston, and a cover member is fixed to the cylindrical casing by a fixing member bolt. The relay valve part sits between the cover member and the partition wall body.

13 Claims, 3 Drawing Sheets

PNEUMATIC BRAKE BOOSTER WITH BOOSTER-CYLINDER-END RETAINED RELAY VALVE

BACKGROUND OF THE INVENTION

1. Field of the Invention

This invention relates to a pneumatic-hydraulic brake booster or air-over hydraulic brake booster for a vehicle.

2. Brief Description of the Prior Art

In a conventional pneumatic-hydraulic brake booster, an internal space of a cylindrical casing is divided into two chambers by a power piston which is slidably fitted to the cylindrical casing. In operation, compressed air is supplied to the one chamber. An output rod is fixed to the power piston, and it extends across the other chamber into a hydraulic cylinder body of a master cylinder part.

The compressed air is supplied to the one chamber directly from a brake valve or through a relay valve from the brake valve. In the former case, only one conduit is connected between the brake booster and the brake valve. The brake system is simple. However, in the latter case, one conduit is connected between the brake valve and the relay valve fixed to a part of the chassis of the vehicle, and another conduit should be connected between the relay valve and the brake booster. The brake system is so complicated. More parts are necessary. Manufacturing efficiency or productivity is low.

When the distance between the brake valve and the brake booster is long, without a relay valve the braking operation lags behind the tread of the brake pedal. The retard can be reduced with the relay valve arranged near the brake booster. However, the conventional brake booster has the above described defects.

The same as the assignee of this application filed the pneumatic-hydraulic brake booster (copending application U.S. Ser. No. 634624) to remove the above-described defects. It includes a master cylinder part; a pneumatic cylinder part combined with said master cylinder part, including a power piston slidably fitted to a cylindrical casing, and an output rod fixed to said power piston, extending to said master cylinder part; a partition wall body fitted to said cylindrical casing; and a relay valve part being arranged at the opposite side of said partition wall body to said power piston in said cylindrical casing, for supplying compressed air into an air pressure chamber formed between said partition wall body and said power piston, and discharging the compressed air from said air pressure chamber to the atmosphere; wherein, when compressed air is supplied into said air pressure chamber through said relay valve part, said power piston, and therefore said output rod are moved forwards to generate hydraulic pressure in said master cylinder part, and said hydraulic pressure is applied to a wheel cylinder.

However, in the above-described pneumatic-hydraulic brake booster, the cylindrical casing is closed at the side of the partition wall body opposite to the power piston. In other words, the cylindrical casing is cup-shaped. The relay valve part is arranged at the bottom of the cylindrical casing. The assembling operation for the relay valve part requires much labor. The manufacturing efficiency is lowered. It is troublesome to disassemble or adjust the relay valve part, or to check the quality of the assembled relay valve part.

SUMMARY OF THE INVENTION

Accordingly, it is an object of this invention to provide a pneumatic-hydraulic brake booster which can simplify the whole braking system, and can facilitate the assembling operation.

Another object of this invention is to provide a pneumatic-hydraulic brake booster which can improve the manufacturing efficiency or productivity.

A further object of this invention is to provide a pneumatic-hydraulic brake booster which is compact in construction.

In accordance with an aspect of this invention, a pneumatic-hydraulic booster for vehicle includes a master cylinder part; a pneumatic cylinder part combined with the master cylinder part which includes a power piston slidably fitted to a cylindrical casing and an output rod fixed to the power piston, extending to the master cylinder part; a partition wall body fitted to the cylindrical casing' and a relay valve part arranged at the opposite side of the partition wall body from the power piston in the cylindrical casing. The relay valve supplies compressed air into an air pressure chamber formed between the partition wall body and the power piston and discharges the compresed air from the air pressure chamber to the atmosphere. When compressed air is supplied into the air pressure chamber through the relay valve part the power piston and the output rod are moved forwards to generate hydraulic pressure in the master cylinder. The hydraulic pressure is applied to a wheel cylinder for braking. The cylindrical casing is open at the side of the partition wall body opposite to the power piston, and a cover member is fixed to the cylindrical casing so as to close the opening of the cylindrical casing by a fixing member bolt. The relay valve part sits between the the cover member and the partition wall body.

The foregoing and other objects, features, and advantages of the present invention will be more readily understood upon consideration of the following detailed description of the preferred embodiment of the invention, taken in conjunction with the accompanying drawing.

DETAILED DESCRIPTION OF THE PREFERRED EMBODIMENTS

First, there will be described one example of the braking system in which pneumatic-hydraulic boosters according to one embodiment of this invention are employed.

Figure 1:
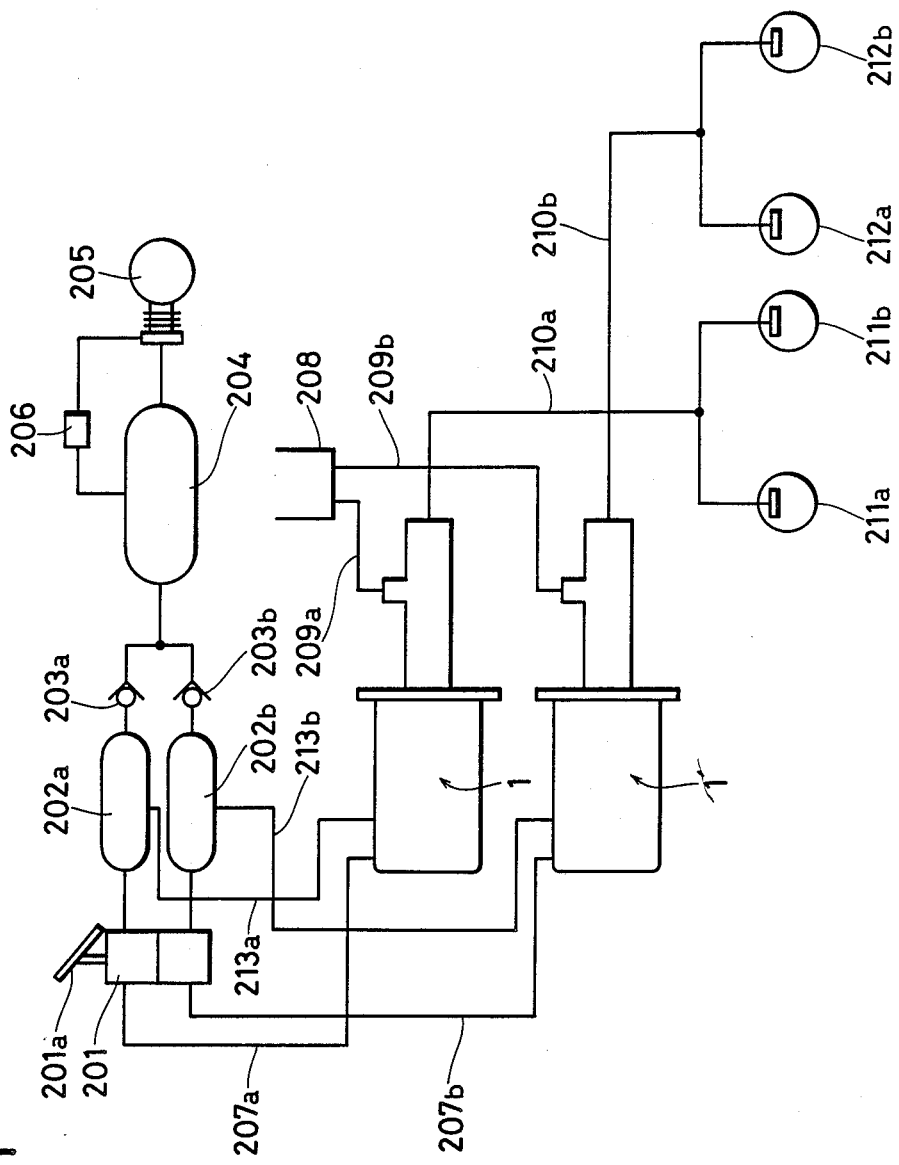
FIG. 1 is a diagramatic view of a braking system in which pneumatic-hydraulic boosters according to one embodiment of this invention are employed.

In FIG. 1, two service ports of a dual brake valve 201 are connected through conduits 207a and 207b to pneumatic-hydraulic boosters 1 and 1' according to one embodiment of this invention, respectively. The boosters 1 and 1' to be hereinafter described in detail are equal to each other in construction and operation. Two air supply ports of the dual brake valve 201 are connected to air reservoir tanks 202a and 202b which are connected through check valves 203a and 203b and a main air reservoir tank 204 to an air compressor 205 respectively.

The check valves 203a and 203b permit air to flow only in the direction towards the air reservoir tanks 202a and 202b from the main tank 204. Further, a pressure governer 206 is connected between the air compressor 205 and the main air reservoir tank 204. An oil reservoir 208 is connected through conduits 209a, 209b to master cylinder parts of the boosters 1 and 1', respectively. When a driver of the vehicle provided with the braking system of FIG. 1 treads a brake pedal 201a of the dual brake valve 201, compressed air is supplied through relay valve parts to be hereinafter described in detail, of the boosters 1 and 1', and pressurized brake oil from the boosters 1 and 1' is supplied through conduits 210a and 210b into wheel cylinders of front wheels 211a, 211b and rear wheels 212a and 212b, for braking them respectively.

Next, only the booster 1 will be described in detail, since the boosters 1 and 1' are equal to each other in construction and operation.

Figure 2:
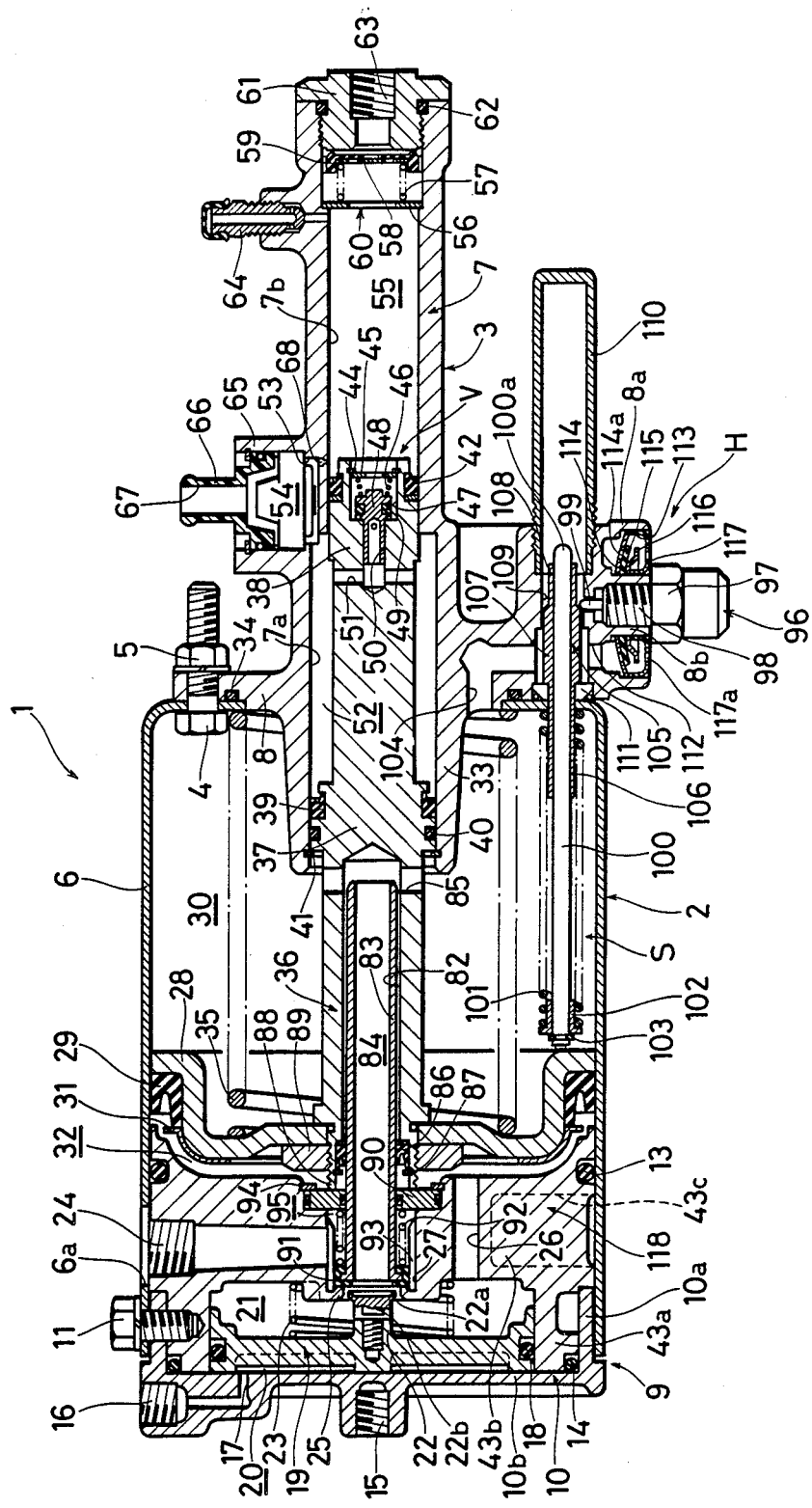
FIG. 2 is a cross-sectional view of the pneumatic-hydraulic booster according to the one embodiment of this invention.

Referring to FIG. 2, the pneumatic-hydraulic booster 1 consists of an air cylinder part 2, a master cylinder part 3 and a relay valve part 9. The air cylinder part 2 and the relay valve part 9 are disposed in a cylindrical casing 6 which is closed at a left end by a cover 10, and is combined with a flange portion 8 of a master cylinder body 7 of the master cylinder part 3 by plural bolts 4 and nuts 5. A screw 15 for fixing to the chassis of the vehicle is formed at the center of the cover 10.

In the air cylinder part 2, a power piston 28 provided with a seal member 29 of rubber is slidably disposed in the casing 6. A connecting rod 36 as an output rod is fixed to the power piston 28, and it is slidably inserted into the master cylinder body 7 of the master cylinder part 3. A holding member 31 is fixed to the power piston 28 in order to prevent the seal member 29 from falling out. The power piston 28 is urged leftwards by a return spring 35 which extends between the power piston 28 and the flange portion 8 of the master cylinder body 7.

An internal space for disposing the air cylinder part 2 is formed by the casing 6, the flange portion 8 of the master cylinder body 7, a projecting portion 33 thereof, and a relay valve main body 118 to be hereinafter described in detail, and it is divided into an air pressure chamber 32 and an atmospheric chamber 30 by the power piston 28. The atmospheric chamber 30 communicates through a path 104 with an exhaust chamber 113 formed in the lower side of the flange portion 8.

In the master cylinder part 3, a stepped hole is formed in the master cylinder body 7, and it consists of a larger diameter hole portion 7a and a smaller diameter hole portion 7b. The connecting rod 36 functions also as a piston in the master cylinder part 3. A top end portion 38 of the connecting rod 36 is slidably fitted to the smaller diameter hole portion 7b, a smaller diameter portion thereof extends along the larger diameter hole portion 7a, and a larger diameter portion 37 thereof is slidably fitted to the larger diameter hole portion 7a. The top end portion 38 of the connecting rod 36 is provided with a seal member 42 of rubber. The larger diameter portion 37 thereof are provided with seal members 39 and 40 of rubber.

A stopper ring 41 is fixed to the end of the projecting portion 33 of the master cylinder body 7, contacting with the larger diameter portion 37 of the connecting rod 36. Thus, the original position of the connecting rod 36 or power piston 28, as shown in FIG. 2 is determined by the stopper ring 41.

A radial through hole 51 is formed in the smaller diameter portion of the connecting rod 36, and an axial stepped hole 47 in communication with the radial through hole 51 is formed in the top end portion 38 of the connecting rod 36. A valve device V is disposed in the axial stepped hole 47. A head portion 48 of a valve member provided with valve rubber 49 is disposed in a larger diameter portion of the stepped hole 47, and a shank portion 50 thereof is slidably fitted to a smaller-diameter portion of the stepped hole 47. A valve spring 46 extends between the head portion 48 of the valve member and a ring 45 which is prevented from falling out by a stopper ring 44 fixed to the top end of the connecting rod 36, and it urges the head portion 48 of the valve member leftwards, contacting the latter with the step portion of the stepped hole 47 in the shown non-operated condition. Thus, the valve device V is closed. When the valve device V is opened by brake oil pressure, as described hereinafter, an auxiliary hydraulic pressure chamber 52 formed around the smaller diameter portion of the connecting rod 36 is made to communicate with a main hydraulic pressure chamber 55 partitioned from the auxiliary hydraulic pressure chamber 52 by the top end portion 38 of the connecting rod 36. Brake oil flows through the radial through hole 51, an inner axial hole of the shank portion 50 of the valve member, a radial hole thereof and the larger diameter hole portion of the stepped hole 47 into the main hydraulic pressure chamber 55.

A plug member 61 provided with a seal member 62 of rubber is screwed to a front end portion of the master cylinder body 7. A central outlet 63 of the plug 61 is connected through the conduit 210a shown in FIG. 1 to the wheel cylinders of the front wheels 211a and 211b. A residue pressure valve 60 is arranged adjacent to the plug member 61 in the master cylinder body 7, and it consists of a spring receiving ring 56, a valve rubber 59, a spring receiving disc 58 attached to the valve rubber 59, a valve spring 57 extended between the spring receiving ring 56 and the spring receiving disc 58. A central opening in alignment with the central outlet 63 is formed in the valve rubber 59. Plural openings are formed in the spring receiving disc 58 eccentrically with the central opening of the valve rubber 59. A bleeder device 64 is screwed to the master cylinder body 7 adjacent to the residue pressure valve 60.

A boss 65 is formed in the upper side of the intermediate portion of the master cylinder body 7. A multiple valve apparatus 54 is disposed in a hole of the boss 65. A connecting member 66 is fitted to the boss 65 above the multiple valve apparatus 54. An inside hole 67 of the connecting member 66 is connected through the conduit 209a (FIG. 1) to the oil reservoir 208.

Figure 3:
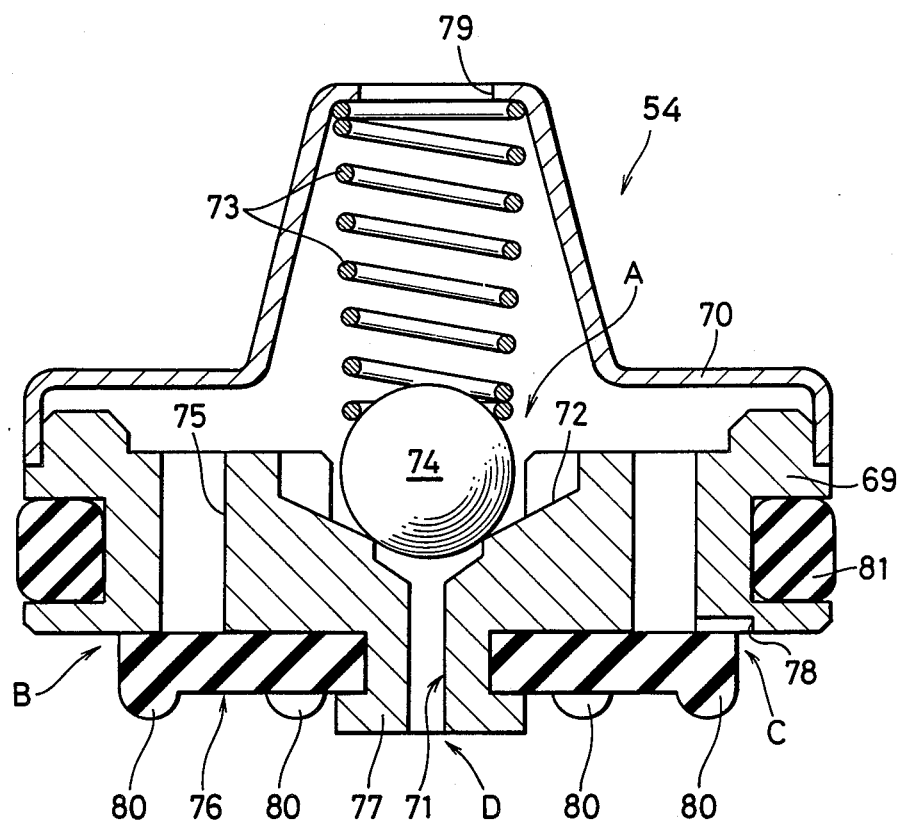
FIG. 3 is a cross-sectional view of a multiple valve apparatus in the booster of FIG. 2.

The detail of the multiple valve apparatus 54 is shown in FIG. 3. It includes a relief valve A, a check valve B and a restricting path C. When the oil pressure of the lower side becomes higher than a predetermined pressure, the relief valve A permits oil to flow only in the direction extending into the upper side from the lower side. The check valve B always permits oil to flow only in the direction extending into the lower side from the upper side. The restricting path C always makes the upper and lower sides communicate with each other, with restriction. The underside of the multiple valve apparatus 54 communicates through a bottom portion 53 of the boss 65 with the auxiliary hydraulic pressure chamber 52. The bottom portion 53 further communicates through a return aperture 68 with the main hydraulic pressure chamber 55 in the shown condition.

In the multiple valve apparatus 54, a main body 69 provided with a seal member 81 of rubber is fitted to the hole of the boss 65. A cup-shaped spring receiver 70 is fixed to the main body 69. A valve seat 72 is formed in a central path 71 of the main body 69. A ball 74 as a valve member is urged to the valve seat 72 by a valve spring 73 which extends between the ball 74 and the bottom of the spring receiver 70. Plural vertical holes 75 are formed around the central path 71 in the main body 69. A disc-like valve member 76 of rubber is fitted to a downward projection 77 of the main body 69, so as to cover the lower ends of the holes 75. Plural round projections 80 are formed in the lower surface of the valve member 76 in order to prevent the valve member 76 from closely contacting with the bottom surface of the boss 63. A small cutout 78 is formed in the lower surface of the main body 69, in communication with one of the vertical holes 75, and it extends laterally outside of the valve member 76. An opening 79 formed in the bottom portion of the cup-shaped spring receiver 70 communicates through the connecting member 67 (FIG. 2) with the oil reservoir 208 (FIG. 1). The relief valve A is constituted by the valve member 74, the valve spring 73, the central path 71 and the valve seat 72. The check valve B is constituted by the vertical holes 75 and the valve member 76. The restricting path C is constituted by the small cutout 78. The lower half of the central path 71 is reduced in cross section so as to form a restricting path D. The throttling effect of the restricting path D is lower than that of the restricting path C.

Next, the detail of the relay valve part 9 will be described with reference to FIG. 2.

The relay valve part 9 is disposed between the left end portion of the cylindrical casing 6 and the cover 10. The valve main body 118 provided with seal members 13 and 14 of rubber is tightly fitted to the left end portion of the casing 6, and to a cylindrical portion 10a of the cover 10.

The cover 10 is cup-shaped. The valve main body 118 has a cylindrical portion 43a which is reduced in diameter. The cylindrical portion 10a of the cover 10 is inserted into the gap between the left end of the cylindrical casing 6 and the cylindrical portion 43a of the valve main body 118. Plural bolts 11 are inserted through round openings of the left end of the cylindrical casing 6 and cylindrical portion 10a of the cover 10, and engaged with screw holes of the cylindrical portion 43a of the valve main body 118. Plural, for example, three or four bolts 11, although only one bolt 11 is shown in FIG. 2, are arranged at regular angular intervals. Thus, the cylindrical casing 6, the cover 8 and the valve main body 118 are fixed to one another as one body.

The main valve body 118 includes the above-described cylindrical portion 43a and a partition wall portion 43b. A relay piston 19 provided with a seal ring 18 of rubber is slidably fitted into the cylindrical portion 43a of the main valve body 118. An axial projection 22 is formed in the center of the relay piston 19, being concentric with the main valve body 118. The relay piston 19 is urged leftwards by a spring 23, and contacts with a flat portion 10b of the cover 10. A first air chamber 20 is formed by the cover 10 and the relay piston 19. It communicates with a path 17 and an input port 16 made in the cover 10. The input port 16 is connected through the conduit 207a (FIG. 1) to the brake valve 201.

A second air chamber 21 is formed between the relay piston 19 and the partition wall portion 43b of the valve main body 118 which functions also as a partition wall for the air pressure chamber 32 of the air cylinder part 2. An axial hole 26 is formed in the lower portion of the partition wall portion 43b, by which the second air chamber 21 is always made to communicate with the air pressure chamber 32. As shown by the chain lines, recesses 43c are made in the main valve body 118 to reduce the weight of the latter.

In the axial projection 22 of the relay piston 19, a bolt-like member 22a is screwed to the center of the relay piston 19. A flange portion is formed at the top end of the bolt-like member 22a. Further, a pair of flat portions 22b are formed on the circumference of the bolt-like member 22a. In the screwing operation, a tool is engaged with the flat portions 22b.

The axial projection 22 of the relay piston 19 is aligned with a central hole 27 of the main body 118. A discharge pipe 83 as a valve member is inserted into the central hole 27 of the main body 118. A rightwardly directed annular valve seat 25 is formed at the left end of the central hole 27 in the main body 118. A rubber ring 91 is attached to a flange formed on the left end of the discharge pipe 83 which is urged leftwards by a valve spring 92, and it seats on the valve seat 25 in the non-operated condition as shown in FIG. 2. An air supply-exhaust valve is constituted by the flange portion of the axial projection 22 of the relay piston 19, the valve seat 25, the rubber ring 91, the discharge pipe 83 and the valve spring 92.

A partition ring 90 provided with seal rings of rubber in its inner and outer circumferences is fixed to the right end of the central hole 27 of the main body 118. The discharge pipe 83 is slidably fitted into the partition ring 90. A compressed air chamber 95 is formed by the partition ring 90 and the main body 118 around the left end portion of the discharge pipe 83 and it always communicates through a radial hole 24 of the main body 118, an opening 6a of the casing 6 and the conduit 213a (FIG. 1) with the air reservoir tank 202a. Accordingly, compressed air is always supplied into the compressed air chamber 95.

The discharge pipe 83 is elongated rightwards across the air pressure chamber 32, and slidably fitted into an axial hole 82 of the connecting rod 36. Radial holes 85 are formed in communication with the axial hole 82 in the connecting rod 83. An inside hole 84 of the discharge pipe 83 communicates through the radial holes 85 with the atmospheric chamber 30 of the air cylinder part 2. Guide ribs 93 are axially formed on the inside wall of the central hole 27 of the main valve body 118 for guiding the valve rubber 91 of the discharge pipe 83. A seal member 86 is fitted between the discharge pipe 83 and a left end portion 88 of the connecting rod 36, and it is prevented from falling out by a stopper 87. Sealing between the axial hole 82 of the connecting rod 36 and the air pressure chamber 32 is effected by the seal member 86. And sealing between the air pressure chamber 32 and the compressed air chamber 95 is effected by the seal rings fitted to the partition ring 90 which is prevented from falling out by a stopper 94.

Next, there will be described a stroke detector S disposed in the lower portion of the atmospheric chamber 30. It consists mainly of a first actuating rod 100, a second hollow actuating rod 105 into which the first actuating rod 100 is inserted, and a switch 96 to be actuated by the second actuating rod 105. The first actuating rod 100 is urged leftwards by a spring 101 which extends between a lower portion of the flange portion 8 of the master cylinder body 7 and a spring receiver 102. It is slidably inserted through the spring receiver 102 which is stopped by a stopper 103 fixed to one end portion of the first actuating rod 100. One end of the first actuating rod 100 contacts with the lower end of the power piston 28. Another end 100a thereof is projecting outwards from the second actuating rod 105 which is slidably fitted to an opening of the casing 6, a spacer ring 111 and a stepped through hole 109 made in the lower end portion of the flange portion 8 of the master cylinder body 7. It consists of a first smaller diameter portion 106, a larger diameter portion 107 and a second smaller diameter portion 108. The first smaller diameter portion 106 is directed to the spring receiver 102 spaced from each other by a predetermined distance.

A movable actuator 99 of the switch 96 contacts with the left end of the second smaller diameter portion 108. Or the former may be facing to the latter, spaced by a slight gap. A taper is formed between the larger diameter portion 107 and the second smaller diameter portion 108.

A protecting member 110 is screwed to the right opening of the stepped through hole 109 for protecting the stroke detector S from water and mud.

A thread 98 is formed on the circumferential surface of the switch 96. It is engaged with a screw hole formed in a downward projection 8a of the flange portion 8 of the master cylinder body 7. A nut-like knob portion 97 is engaged with a tool in the screwing operation. Electrical wires are led out from the switch 96, although not shown, and they are connected to a not-shown alarm device.

Next, there will be described an exhaust check valve H arranged adjacent to the switch 96.

The exhaust check valve H is arranged in the exhaust chamber 113 which is formed as annular recess in the downward projection 8a and communicates through a hole 112 with the larger diameter hole portion of the stepped through hole 109. The larger diameter hole portion communicates through the path 104 with the atmospheric chamber 30 in the casing 6.

A seat ring 114 is fitted to the angular recess 113. A valve rubber ring 115 is fixed at the central portion between the seat ring 114 and a first support member 116 which is fitted to an inner cylindrical portion 8b of the downward projection 8a. The first support member 116 is supported by a second support member 117 which is fitted to the annular recess 113.

When the thread 98 of the switch 96 is screwed to the inner cylindrical portion 8b of the downward projection 8a with the tool applied to the nut-like knob 97, the seat ring 114, the valve rubber ring 115, the first and second support member 116 and 117 are fixed as one body to the downward projection 8a at the same time. Small openings 114a are formed in the seat ring 114, and they are normally covered with the valve rubber ring 115 which is flexible. Small openings 117a are formed also in the second support member 117. When the outer circumferential portion of the valve rubber ring 115 is deformed downward by the compressed air from the atmospheric chamber 30, the latter communicates through the openings 114a of the seat ring 114 and thoes 117a of the second support member 117 with the atmosphere.

Next, there will be described operations of the booster 1.

When the driver treads the brake pedal 201a of the dual brake valve 201, compressed air is supplied as an input compressed air through the conduit 207a, the input port 16 and the path 17 into the first air chamber 20 of the relay valve part 9. The relay piston 19 is moved rightwards. The flange 22a of the axial projection 22 comes to contact with the valve rubber 91 attached to the top end of the discharge pipe 83. Thus, the opening of the discharge pipe 82 is closed by the axial projection 22 to cut the communication between the second air chamber 21 and the atmospheric chamber 30. With further rightward movement of the relay piston 19, the discharge pipe 83 is pushed rightwards by the axial projection 22 and, the valve rubber 91 is separated from the valve seat 25. Thus, the compressed air chamber 95 is made to communicate through the second air chamber 21 and the path 26 with the air pressure chamber 32. Compressed air from the reservoir tank 202a is supplied as an output compressed air into the air pressure chamber 32. The power piston 28, and therefore the connecting rod 36 are moved forwards against the preload of the return spring 35.

With the rightward movement of the connecting rod 36, oil pressures in the auxiliary hydraulic pressure chamber 52 and the main hydraulic pressure chamber 55 start to rise. Pressurized oil from the auxiliary hydraulic pressure chamber 52 flows through the radial through hole 51, the inside hole of the shank portion 50 of the valve member, the radial opening thereof and the opened valve device V into the main hydraulic pressure chamber 55. Since the oil pressure in the auxiliary hydraulic pressure chamber 52 rises sooner than the oil pressure in the main hydraulic pressure chamber 55 due to the larger diameter portion 37, the valve device V is opened by the oil pressure from the auxiliary hydraulic pressure chamber 52.

The volumes of the auxiliary pressure chamber 52 and main pressure chamber 55 decreases with the rightward movement of the connecting rod 36. Oil from the main pressure chamber 55 flows through the deformed valve rubber 59, the central outlet 63 of the plug member 61, and the conduit 210a (FIG. 1) into the wheel cylinders of the front wheels 211a and 211b. The flow amount of oil from the central outlet 63 towards the wheel cylinders of the front wheels 211a and 211b is nearly equal to the sum of the decreases of the volumes of the auxiliary pressure chamber 52 and main pressure chamber 55.

Although the moved length of the connecting rod 36 is small at the initial stage, the discharge amount of oil is relatively large, since the cross-section area of the larger diameter portion 37 of the connecting rod 36 is relatively large. The pressure rise of oil is relatively small, since the pressure is equal to the division of the movement force of the connecting rod 36 by the cross-section area of the larger diameter portion 37. Although the restricting path C is always open in the multiple valve apparatus 54, the flow amount of oil towards the oil reservoir 208 is negligibly small, since the throttling effect is sufficiently high.

When the oil pressure of the auxiliary pressure chamber 52 rises to the opening pressure of the relief valve A of the multiple valve apparatus 52, the pressurized oil starts to flow towards the oil reservoir from the auxiliary pressure chamber 52. Thus, the pressure rise of the auxiliary pressure chamber 52 is restricted to the opening pressure of the relief valve A. The oil pressure of the main pressure chamber 55 continues to rise with the forward movement of the connecting rod 26. The valve rubber 49 is closed. The relief valve A continues to be opened. The pressure rise rate of the main pressure chamber 55 is increased. Before the relief valve A is opened, the movement force of the connecting rod 36 is distributed to rise the oil pressure of the auxiliary pressure chamber 52 and that of the main pressure chamber 55. After the relief valve A is opened, the movement force of the connecting rod 36 is distributed to open the relief valve A and to rise the oil pressure of the main pressure chamber 55. Accordingly, the rate of the oil pressure rise of the main pressure chamber 55 is increased. Higher pressure is generated in the main pressure chamber 55.

When the oil pressure rises nearly to an aimed pressure, the movement of the connecting rod 36 almost stops. The decrease of the volume of the auxiliary pressure chamber 52 almost ends. The pressurized oil from the auxiliary pressure chamber 52 flows through the restricting path C towards the oil reservoir. The pressure of the auxiliary pressure chamber 52 is gradually lowered. At last, it becomes zero. Now, all of the movement force of the connecting rod 36 is used to rise the oil pressure of the main pressure chamber 55. The pressure of the main pressure chamber 55 becomes higher. At last, it reaches the aimed pressure. Thus, the front wheels 211a and 211b are braked at the aimed braking force.

When the driver releases the pedal 201a from treading, the compressed air is exhausted from the first air chamber 20. The relay piston 19 is moved back leftwards to the original position by the spring 23. The axial projection 22 is separated from the discharge pipe 83. The valve rubber 91 comes to contact with the valve seat 25. The second air chamber 21 is made to communicate with the path 84. Thus, the compressed air flows out from the air pressure chamber 32 into the atmospheric chamber 30 through the path 26, the second pressure chamber 21, the path 84 and the hole 85. Then, it flows through the paths 104 and 112 and deforms the check valve rubber 115 and is discharged to the atmosphere. The power piston 28 and therefore the connecting rod 36 are rapidly moved back leftwards to the original positions by the spring force of the return spring 35 and the discharging compressed air.

With the rapid leftward movement of the connecting rod 36, negative pressures are generated in the auxiliary pressure chamber 52 and the main pressure chamber 55. The valve rubber 76 is deformed in the multiple valve apparatus 54. Brake oil flows from the oil reservoir side into the auxiliary pressure chamber 52. It opens the valve rubber 49, and flows from the auxiliary pressure chamber 52 into the main pressure chamber 55. Further, brake oil flows from the bottom portion 53 of the boss 65 into the main pressure chamber 55 through the return aperture 68. Thus, the negative pressure is compensated in the chambers 52 and 55.

When the connecting rod 36 is moved leftwards almost to the original position, the pressure become lower in the chambers 52 and 55. The pressurized oil from the wheel cylinders of the front wheels 211a and 211b opens the residue pressure valve 60, and it returns into the main pressure chamber 55. Further, it flows through the return aperture 68 and the restricting path C of the multiple valve apparatus 54 into the oil reservoir 208. With the stop of the oil flow, operation of the booster 1 ends. The opening pressure of the residue pressure valve 60 which is determined by the spring force of the spring 57, is left in the wheel cylinders of the front wheels 211a and 211b.

In the above-described operation, when the power piston 28 is moved forwards, the first actuating rod 100 in the stroke detector S is pushed rightwards by the power piston 28. Accordingly, the top end 100a of the first actuating rod 100 is projected outwards more from the second actuating rod 105 with the forward movement of the power piston 28. Although the power piston 28 cannot be seen from the outside, the driver can know by the projecting length of the first actuating rod 100 how much the power piston 28 is moved forwards, when the protecting member 110 is removed. For example, in the air purge operation of the manufacturing process of the booster 1, it can be known by the projecting length of the first actuating rod 100 how much air is purged from the master cylinder part 3 and the conduit system connected to the part 3.

When the conduit system breaks and oil leaks in use of the booster 1, or when the brake shoe of the wheel wears excessively, the power piston 28 is moved excessively rightwards in operation, so that the spring receiver 103 comes to contact with the second actuating rod 105, and pushes it forwards. The actuator 99 is pushed down by the taper between the second smaller diameter portion 108 and the larger diameter portion 107 of the second actuating rod 105. The switch 96 turns on to drive a not-shown alarm.

In comparison with the conventional pneumatic-hydraulic booster, the booster according to the above embodiment of this invention has the following advantages:

(1) A conduit for connecting a relay valve and a pneumatic-hydraulic booster is not necessary in the booster of this invention. Thus, the braking system can be simplified. The number of the necessary parts can be reduced. The assembling operation can be facilitated. Accordingly, the labor or manufacturing efficiency can be improved.

(2) In the previously filed booster (U.S. Ser. No. 634,624), the cylindrical casing for the air-cylinder part and relay valve part is closed at one end. Accordingly, it is troublesome to assemble the relay valve part and the power cylinder into the cylindrical casing. However, in the booster according to this invention, the cylindrical casing 6 is open at the one end, and the opening is closed with the cover 10. Accordingly, it is easy to assemble the relay valve part 9 and the air cylinder part 2 into the cylindrical casing 6, and to disassemble them.

(3) The main body 118 for the relay valve and the cover 10 are fixed to the casing 6 by the bolts 11 in common. In comparison with a booster in which the main body for the relay valve and the cover are separately fixed to the casing by individual groups of bolts, the number of the parts is decreased in the booster of the above embodiment. Further, since the main body 118 and the cover 10 are assembled to the casing 6 at the same time, and the number of the fastening operations of the bolts is decreased, the assembling efficiency and productivity can be improved.

(4) Further in the above embodiment, the valve rubber 115 and the valve seat member 114 for constituting the exhaust valve H are arranged at the same projection 8a of the master cylinder body 7 as the switch 96. They are fixed to the projection 8a at the same time when the switch 96 is screwed to the projection 8a. Accordingly the assembling operation of the booster according to the embodiment is simple in comparison with that of the booster in which the exhaust valve and the switch are arranged at individual places. The number of the parts is decreased. Another projection for the exhaust valve or the switch is not required. Accordingly the booster can be simplified and compact.

While the preferred embodiment has been described, variations thereto will occur to those skilled in the art within the scope of the present inventive connects which are delineated by the following claims.

For example, in the above embodiment, the connecting rod 36 as the output rod is inserted into the master cylinder part 3, and it functions also as a piston for the master cylinder part. However, the output rod may be a separate body from the piston for the master cylinder part. In this case, the former is combined with the latter through suitable means.

Further, in the above embodiment, the connecting rod 36 has the larger diameter portion 36 in the master cylinder part 3, and the auxiliary hydraulic pressure chamber 52 is formed between the larger diameter portion 37 and the top end portion 38. With such arrangment, the brake can be more rapidly applied to the wheels, since more brake oil is supplied to the wheel cylinders at the initial stage of the braking operation, and necessary stroke of the connecting rod 36 for braking can be reduced. This invention may be applied to a pneumatic-hydraulic booster which includes a usual master cylinder part without the auxiliary hydraulic pressure chamber 52. However, the booster including the shown master cylinder part with the auxiliary hydraulic pressure chamber 52 can be shorter, since necessary stroke is smaller.

Further in the above embodiment, the main body 118 for the relay valve part 9 and the cover 10 are fixed to the cylindrical casing 6 by the bolts 11. However, they may be fixed to the casing 6 by any other fixing means such as weld. In such a case, the cylindrical portion 43a of the main body 118 does not need to be reduced in outer diameter, and the cylindrical portion 10a is omitted from the cover 10.

What is claimed is:

1. A pneumatic-hydraulic brake booster for vehicle comprising:
    (a) a master cylinder part;
    (b) a pneumatic cylinder part combined with said master cylinder part, including a power piston slideably fitted to a cylindrical casing, and an output rod fixed to said power piston, extending to said master cylinder part;
    (c) a partition wall body fitted to said cylindrical casing; and
    (d) a relay valve part being arranged at the opposite side of said partition wall body to said power piston in said cylindrical casing, for supplying compressed air into an air pressure chamber formed between said partition wall body and said power piston, and discharging the compressed air from said air pressure chamber to the atmosphere; wherein, when compressed air is supplied into said air pressure chamber through said relay valve part, said power piston, and therefore said output rod are moved forwards to generate hydraulic pressure in said master cylinder part, and said hydraulic pressure is applied to a wheel cylinder, said cylinder casing enclosing said pneumatic cylinder part and said relay valve part and having an opening at the opposite side of said partition wall body to said power piston, cover means secured to said cylindrical casing so as to close the opening of said cylindrical casing, said relay valve being arranged between said cover means and said partition wall body, and said cover means and said partition wall body being fixed to said cylindrical casing by a common fixing means such that removal of said fixing means allows for removal of said cover means.

2. A pneumatic-hydraulic brake booster according to claim 1, in which said partition wall body includes a partition wall portion for partitioning said air pressure chamber and a cylindrical portion formed at the opposite side of said partition wall portion to said air pressure chamber, and said relay valve part includes a relay piston, a valve member arranged in a central hole of said partition wall portion, a valve seat formed at the end of said central hole in said partition wall portion, and a valve spring for urging said valve member to said valve seat, said relay piston being slidably fitted to said cylindrical portion and facing to said valve member, and said cover means includes a flat portion for covering the opening of said cylindrical casing and a cylindrical portion which is fittable to said cylindrical casing and said cylindrical portion of the partition wall body, said cover means and said partition wall body being fixed to said cylindrical casing at said respective cylindrical portions by said fixing means.

3. A pneumatic-hydraulic brake booster according to claim 1, in which said output rod is inserted into a master cylinder body of said master cylinder part, and functions as a hydraulic piston for said master cylinder part.

4. A pneumatic-hydraulic brake booster according to claim 1, in which said connecting rod has a top end portion slidably fitted to a smaller diameter portion of a stepped hole of said master cylinder body, and a larger diameter portion slidably fitted to a larger diameter portion of said stepped hole, an auxiliary hydraulic pressure chamber and a main hydraulic pressure chamber are formed at both sides of said top end portion, said auxiliary hydraulic pressure chamber being connected through a valve device with said main hydraulic pressure chamber, and a multiple valve apparatus consisting of a relief valve, a check valve and a restriction path are arranged between a brake oil reservoir and said auxiliary hydraulic pressure chamber.

5. A pneumatic-hydraulic brake booster according to claim 1, in which a residue pressure valve is arranged adjacent to the outlet to the wheel cylinder in said master cylinder part.

6. A pneumatic-hydraulic brake booster according to claim 1, in which said valve member is elongated into an axial inner hole of said output rod, passing air-tightly and slidably through said partition wall body, and said valve member has an axial inner hole facing to said relay piston at one side and communicating at another side through a radial hole of said output rod with an atmospheric chamber formed at the opposite side of said power piston to said air pressure chamber in said cylindrical casing.

7. A pneumatic-hydraulic brake booster according to claim 6, in which a compressed air chamber is formed around said valve member in said central hole of the partition wall body, said compressed air chamber communicating through a radial hole made in said partition wall body and an opening made in said cylindrical casing with an air reservoir, and compressed air being always supplied to said compressed air chamber from said air reservoir.

8. A pneumatic-hydraulic brake booster according to claim 7, in which two air chambers are formed at both sides of said relay piston, one of said two air chamber communicating through an opening made in said cover means with a brake valve to be operated by the driver of the vehicle, and the other of said two air chambers communicating through an axial hole made in said partition wall body, with said air pressure chamber, and when said brake valve is trodden by the driver, compressed air is supplied as an input air into said one of the two air chambers to move said relay piston to said valve member, cut the communication between said other of the two air chamber and said atmospheric chamber and separate said valve member from said valve seat, and said compressed air chamber is made to communicate with said air pressure chamber to supply compressed air as an output air into said air pressure chamber.

9. A pneumatic-hydraulic brake booster according to claim 8, in which an exhaust check valve is arranged in said pneumatic cylinder part, in communication with said atmospheric chamber and the atmosphere.

10. A pneumatic-hydraulic brake booster according to claim 9, in which a stroke detector faces said power piston, so as to detect the moved length of said power piston and alarm the driver of a moved length longer than a predetermined length.

11. A pneumatic-hydraulic brake booster according to claim 10, in which said stroke detector includes a switch.

12. A pneumatic-hydraulic brake booster according to claim 11, in which said exhaust check valve includes a valve rubber ring fitted to a projection of said pneumatic cylinder part, and said switch includes a thread portion, said thread portion being screwed into a threaded hole of said projection.

13. A pneumatic-hydraulic brake booster for a vehicle comprising:

(a) a master cylinder part;
(b) a pneumatic cylinder part coaxially attached to said master cylinder part, including a cylindrical casing, a power piston slidably fitted in said cylindrical casing, and an output rod fixed to said power piston, extending towards said master cylinder part;
(c) a partition wall body including a cylindrical portion removably fitted into said cylindrical casing; and
(d) a relay valve part being arranged at the opposite side of said partition wall body from said power piston in said cylindrical casing, for supplying compressed air into an air pressure chamber formed between said partition wall body and said power piston, and discharging the compressed air from said pressure chamber to the atmosphere; wherein, when compressed air is supplied into said air pressure chamber through said relay valve part, said power piston, and therefore said output rod are moved forward to generate hydraulic pressure in said master cylinder part, and said hydraulic pressure is applied to a wheel cylinder, said cylindrical casing is open at the opposite side of said partition wall body from said power piston, and a separate cover means is fixed to said cylindrical casing so as to close the opening of said cylindrical casing, said cover means including a flat portion for covering the opening of said cylindrical casing and a cylindrical portion which is fittable into said cylindrical casing, said cylindrical portion of said cover means also being fittable over said cylindrical portion of said wall body portion such that said cylindrical casing, said cylindrical portion of said cover means, and said cylindrical portion of said partition wall body overlap at a common area, said cover means, said cylindrical casing, and said partition wall body being fixed together at said common area by a common fixing means, said relay valve being arranged between said cover means and said partition wall body, whereby removal of said fixing means allows for removal of said cover means, said relay valve, said partition wall body, said power piston and said output rod from the opening in said cylindrical casing.

* * * * *